(12) United States Patent
Yuan

(10) Patent No.: US 10,819,913 B2
(45) Date of Patent: Oct. 27, 2020

(54) METHOD AND APPARATUS FOR INHIBITING AEC JUMP, AND TERMINAL DEVICE

(71) Applicant: GUANGDONG OPPO MOBILE TELECOMMUNICATIONS CORP., LTD., Dongguan, Guangdong (CN)

(72) Inventor: Quan Yuan, Dongguan (CN)

(73) Assignee: GUANGDONG OPPO MOBILE TELECOMUNNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/630,332

(22) PCT Filed: Jun. 5, 2018

(86) PCT No.: PCT/CN2018/089991
§ 371 (c)(1),
(2) Date: Jan. 10, 2020

(87) PCT Pub. No.: WO2019/011079
PCT Pub. Date: Jan. 17, 2019

(65) Prior Publication Data
US 2020/0162675 A1    May 21, 2020

(30) Foreign Application Priority Data
Jul. 10, 2017  (CN) .......................... 2017 1 0557841

(51) Int. Cl.
*H04N 5/232*  (2006.01)
*H04N 5/235*  (2006.01)
(Continued)

(52) U.S. Cl.
CPC ....... *H04N 5/23296* (2013.01); *H04N 5/2254* (2013.01); *H04N 5/2258* (2013.01);
(Continued)

(58) Field of Classification Search
CPC .... H04N 5/235; H04N 5/2254; H04N 5/2258; H04N 5/23212; H04N 5/23245; H04N 5/23296
See application file for complete search history.

(56) References Cited

U.S. PATENT DOCUMENTS

| 5,452,047 A * | 9/1995 | Fujii ...................... G03B 7/097 396/133 |
| 7,940,324 B2 * | 5/2011 | Hibino ................... G03B 7/093 348/362 |

(Continued)

FOREIGN PATENT DOCUMENTS

| CN | 10634796 A | 1/2010 |
| CN | 104954699 A | 9/2015 |

(Continued)

OTHER PUBLICATIONS

International Search Report and Written Opinion of the International Searching Authority in International PCT Application No. PCT/CN2018/089991, Publication Date Sep. 10, 2018 (17 pages).

(Continued)

*Primary Examiner* — Ngoc Yen T Vu

(57) ABSTRACT

The present invention provides a method and apparatus for inhibiting AEC jump, and a terminal device. The method comprises: obtaining a target zoom multiple to which a camera apparatus is to be switched; determining whether the target zoom multiple is within a preset target range; if the target zoom multiple is within the target range, controlling to simultaneously open a wide-angle lens and a telephoto lens; obtaining a first AEC value of the wide-angle lens and a second AEC value of the telephoto lens; and determining a target AEC value corresponding to the target zoom multiple according to the first AEC value and the second AEC value. In the embodiment of the method, when the target zoom multiple is within the set range, two lenses can be (Continued)

opened simultaneously, and the AEC values of the two lenses can be integrated in advance. Therefore, the problem of AEC brightness jump during lens switching is solved, the photographing effect is enhanced, and the user experience is enhanced.

20 Claims, 4 Drawing Sheets

(51) Int. Cl.
H04N 5/225 (2006.01)
H04N 9/04 (2006.01)
(52) U.S. Cl.
CPC ......... *H04N 5/235* (2013.01); *H04N 5/23212* (2013.01); *H04N 5/23245* (2013.01); *H04N 9/045* (2013.01)

(56) References Cited

U.S. PATENT DOCUMENTS

| | | | |
|---|---|---|---|
| 9,185,291 B1 | 11/2015 | Shabtay et al. | |
| 9,270,968 B2* | 2/2016 | Suzuki | H04N 5/232 |
| 10,057,499 B1* | 8/2018 | Chen | H04N 5/23293 |
| 10,681,273 B2* | 6/2020 | Kim | H04N 5/23241 |
| 2004/0085475 A1 | 5/2004 | Skow | |
| 2007/0024737 A1 | 2/2007 | Nakamura | |
| 2011/0012998 A1 | 1/2011 | Pan | |
| 2016/0050374 A1 | 2/2016 | Shabtay et al. | |
| 2016/0227100 A1* | 8/2016 | Liu | H04N 5/23212 |
| 2016/0241793 A1 | 8/2016 | Ravirala et al. | |
| 2017/0150061 A1 | 5/2017 | Shabtay et al. | |
| 2018/0152640 A1 | 5/2018 | Shabtay et al. | |
| 2018/0359423 A1 | 12/2018 | Shabtay et al. | |
| 2019/0109993 A1 | 4/2019 | Shabtay et al. | |
| 2019/0230291 A1 | 7/2019 | Shabtay et al. | |

FOREIGN PATENT DOCUMENTS

| | | |
|---|---|---|
| CN | 105681668 A | 6/2016 |
| CN | 105847660 A | 8/2016 |
| CN | 105959553 A | 9/2016 |
| CN | 106341611 A | 1/2017 |
| CN | 106713887 A | 5/2017 |
| CN | 107343155 A | 11/2017 |
| CN | 107483808 A | 12/2017 |
| EP | 2278821 A2 | 1/2011 |
| JP | 2008172523 A | 7/2008 |
| JP | 2015233258 A | 12/2015 |
| WO | 2016130325 A1 | 8/2016 |

OTHER PUBLICATIONS

Supplemental Search Report of the International Searching Authority in Chinese Priority Application No. CN201710557841.6, Publication Date Feb. 20, 2019 (1 page).
First Office Action in Chinese Priority Application No. CN201710557841.6, Publication Date Jan. 3, 2019 (9 pages).
First Office Action of the European application No. 18832253.1, dated Apr. 20, 2020.

* cited by examiner

METHOD AND APPARATUS FOR INHIBITING AEC JUMP, AND TERMINAL DEVICE

CROSS-REFERENCE TO RELATED APPLICATIONS

The present disclosure claims priority to Chinese Patent Application No. 201710557841.6, filed by Guangdong OPPO Mobile Telecommunications Corp. Ltd. on Jul. 10, 2017, and entitled "Method and device for inhibiting AEC jump, and terminal equipment".

TECHNICAL FIELD

The disclosure relates to the field of electronic devices, and more particularly, to a method and device for suppressing Automatic Exposure Control (AEC) hopping and a terminal device.

BACKGROUND

Along with continuous development of electronic devices, requirements of users on shooting functions of the electronic devices have increased and requirements on AEC of a photographic apparatus in the electronic device have also increased. At present, when the photographic apparatus in the electronic device switches a zooming factor, for example, switching from ZOOM 1× to ZOOM 2×, the photographic apparatus may switch from a wide-angle lens to a telephoto lens.

At a moment of lens switching, since another camera has just been started, default AEC of the camera may be mismatched with a light condition of a current environment and AEC is required to be regulated according to the light condition of the environment.

SUMMARY

The disclosure is intended to solve at least one of the technical problems in a related art to a certain extent.

To this end, the disclosure proposes a method for suppressing AEC hopping, to solve the problem of AEC brightness hopping during lens switching, improve a shooting effect, improve a user experience and solve the existing problem that AEC brightness may hop to cause a flickering phenomenon at a lens switching moment due to the fact that, at the lens switching moment, since another camera is just started, default AEC of the camera may be mismatched with a light condition of a present environment and AEC is required to be regulated according to the light condition of the environment.

The disclosure proposes a device for suppressing AEC hopping.

The disclosure proposes a terminal device.

The disclosure proposes a computer-readable storage medium.

An embodiment of the disclosure proposes a method for suppressing AEC hopping, which includes the following operations.

A target zooming factor that a photographic apparatus is trying to switch to is acquired.

Whether the target zooming factor is within a preset target range or not is determined.

In the case that the zooming factor is within the target range, a wide-angle lens and a telephoto lens are controlled to be simultaneously turned on.

A first AEC value of the wide-angle lens and a second AEC value of the telephoto lens are acquired.

A target AEC value corresponding to the target zooming factor is determined according to the first AEC value and the second AEC value.

According to the method for suppressing AEC hopping in the embodiment of the disclosure, the target zooming factor that the photographic apparatus is trying to switch to is acquired, the wide-angle lens and the telephoto lens are controlled to be simultaneously turned on when the zooming factor is within the target range, the first AEC value of the wide-angle lens and the second AEC value of the telephoto lens are acquired, and the target AEC value corresponding to the target zooming factor is determined according to the first AEC value and the second AEC value. In the embodiment, when the target zooming factor is within the set range, the two lenses may be simultaneously turned on, and the AEC values of the two lenses are merged in advance, so that the problem of AEC brightness hopping during lens switching may be solved, a shooting effect may be improved, and a user experience may be improved.

Another embodiment of the disclosure discloses a device for suppressing AEC hopping, which includes an acquisition module, a first judgment module, a first control module, an acquisition module and a determination module.

The acquisition module is configured to acquire a target zooming factor that a photographic apparatus is trying to switch to.

The first judgment module is configured to determine whether the target zooming factor is within a target range or not.

The first control module is configured to, when the target zooming factor is within the target range, perform control to simultaneously turn on a wide-angle lens and a telephoto lens.

The acquisition module is configured to acquire a first AEC value of the wide-angle lens and a second AEC value of the telephoto lens.

The determination module is configured to determine a target AEC value corresponding to the target zooming factor according to the first AEC value and the second AEC value.

According to the device for suppressing AEC hopping in the embodiment of the disclosure, the target zooming factor that the photographic apparatus is trying to switch to is acquired, the wide-angle lens and the telephoto lens are controlled to be simultaneously turned on when the zooming factor is within the target range, the first AEC value of the wide-angle lens and the second AEC value of the telephoto lens are acquired, and the target AEC value corresponding to the target zooming factor is determined according to the first AEC value and the second AEC value. In the embodiment, when the target zooming factor is within the set range, the two lenses may be simultaneously turned on, and the AEC values of the two lenses are merged in advance, so that the problem of AEC brightness hopping during lens switching may be solved, a shooting effect may be improved, and a user experience may be improved.

Another embodiment of the disclosure proposes a terminal device, which includes one or more of the following components: a housing, as well as a processor, a memory and a photographic module that are located in the housing. The processor reads an executable program code stored in the memory to run a program corresponding to the executable program code to implement the method for suppressing AEC hopping in the embodiments of the disclosure.

Another embodiment of the disclosure proposes a computer-readable storage medium, in which a computer program is stored. The computer program is executed by a processor to implement the method for suppressing AEC hopping in the embodiments of the disclosure.

Another embodiment of the disclosure proposes a computer program product, an instruction in the computer program product being executed by a processor to execute the method for suppressing AEC hopping in the embodiments of the disclosure.

Additional aspects and advantages of the disclosure will be partially presented in the following descriptions and partially become apparent from the following descriptions or be understood by implementing the disclosure.

BRIEF DESCRIPTION OF DRAWINGS

In order to describe the technical solutions in the embodiments of the disclosure more clearly, the drawings required to be used in the embodiments will be simply introduced below. It is apparent that the drawings described below are some embodiments of the disclosure. Other drawings may further be obtained by those of ordinary skill in the art according to these drawings without creative work.

DETAILED DESCRIPTION

Figure 1:
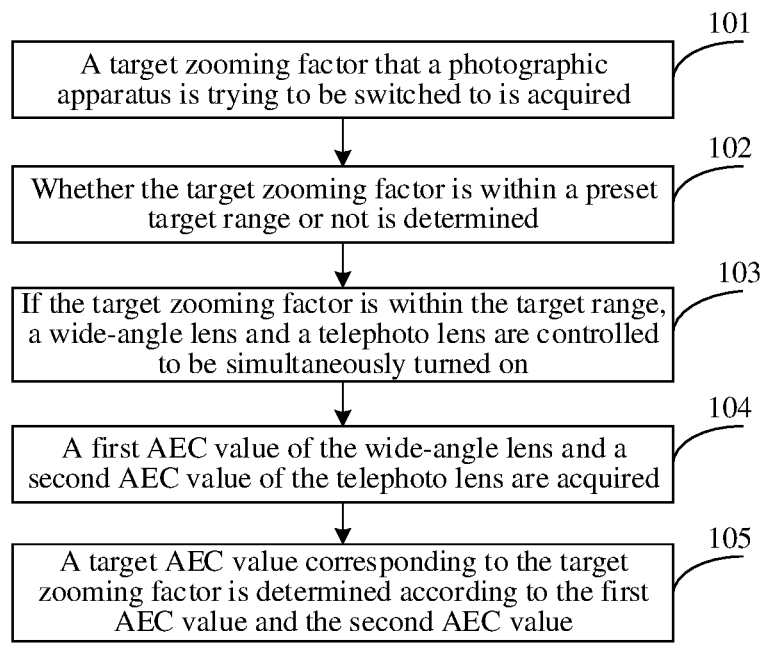
FIG. 1 is a flowchart of a method for suppressing AEC hopping according to an embodiment of the disclosure.

The embodiments of the disclosure will be described below in detail. Examples of the embodiments are illustrated in the drawings. Same or similar reference signs in the drawings always represent same or similar components or components with the same or similar functions. The embodiments described below with reference to the drawings are exemplary and intended to explain the disclosure and should not be construed in any way to limit the scope of the disclosure.

A method and device for suppressing AEC hopping and terminal device according to the embodiments of the disclosure will be described below with reference to the drawings. Before the embodiments of the disclosure are specifically described, common technical terms will be introduced at first for convenient understanding.

Wide-angle lens: it has the characteristics of a short focal length, a wide viewing angle and a wide depth of field, and is suitable for close-up shooting.

Telephoto lens: it has the characteristics of a long focal length, a small viewing angle and a small depth of field, and is suitable for long-range shooting.

At present, an aperture value and a shutter speed may be automatically controlled by AEC to control an amount of incoming light, so as to adjust the whole brightness of a captured scene and improve shooting quality. When a zooming factor of a camera is switched, it is necessary to regulate AEC to regulate the amount of incoming light.

However, at present, when the zooming factor of the camera is switched or a shooting environment of the camera is changed, for example, changed from a relatively strong light environment to a relatively weak light environment, AEC of the camera may hop to cause flickering.

In view of this problem, the embodiments of the disclosure disclose a method for suppressing AEC hopping, so as to acquire an AEC value according to brightness information of an environment where a terminal device is located to accelerate AEC convergence.

FIG. 1 is a flowchart of a method for suppressing AEC hopping according to an embodiment of the disclosure.

As shown in FIG. 1, the method for suppressing AEC hopping includes the following steps.

At 101, a target zooming factor that a photographic apparatus is trying to switch to is acquired.

For example, after a close-up scenery is shot by use of the photographic apparatus in a terminal device such as a mobile phone or a pad, a zooming factor of the photographic apparatus is increased to shoot a distant scenery. In such case, the target zooming factor that the photographic apparatus is trying to switch to may be acquired.

When the zooming factor of the photographic apparatus is switched, for example, switched from ZOOM 1× to ZOOM 2×, a switching instruction is sent, and the switching instruction may include a present zooming factor, the target zooming factor after switching and the like. In the embodiment, a monitor may be set to monitor the zooming factor switching instruction, and when the switching instruction is monitored, the target zooming factor is extracted from the switching instruction.

As an example, an icon for switching the zooming factor may be set on a photographic interface, and a user may click the icon to switch the zooming factor. For example, for each zooming factor, one icon may be set for the zooming factor, or two icons may be set, one for increasing the zooming factor and the other one for reducing the zooming factor. The zooming factor may be changed by clicking on one of the icons.

At 102, whether the target zooming factor is within a preset target range or not is determined.

In the embodiment of the disclosure, the target range may be preset by a built-in program of the terminal device, or, the target range may also be set by the user according to an own requirement. There are no limits made thereto. For example, the target range may be marked to be [first zooming factor, second zooming factor].

It may be understood that a transitional zooming factor region may be set in advance for switching from a wide-angle lens to a telephoto lens and is recorded as the target range in the embodiment of the disclosure. The target range includes the zooming factors for switching between the wide-angle lens and the telephoto lens. The target range is [first zooming factor, second zooming factor]. When the zooming factor is gradually increased to the second zooming factor, a lens may be switched from the wide-angle lens to the telephoto lens. Correspondingly, when the zooming factor is gradually decreased to the first zooming factor, the lens may be switched from the telephoto lens to the wide-angle lens.

For example, the first zooming factor may be ZOOM 1.5× and the second zooming factor may be ZOOM 6×. Then, the preset target range is [ZOOM 1.5, ZOOM 6×]. When the present zooming factor is more than or equal to ZOOM 6×, the lens is switched to the telephoto lens.

Specifically, whether the target zooming factor is within the preset target range or not is determined, namely the target zooming factor is compared with the first zooming factor and the second zooming factor. If the target zooming factor is greater than the first zooming factor and less than the second zooming factor, it is indicated that the target zooming factor falls within the target range, and 103 is executed.

If the target zooming factor is not within the preset target range, there may be two cases. In one case, the target zooming factor is less than the first zooming factor, and in such case, only the wide-angle lens may be turned on. In the other case, the target zooming factor is greater than the second zooming factor, and in such case, only the telephoto lens may be turned on.

At 103, if the zooming factor is within the target range, a wide-angle lens and a telephoto lens are controlled to be simultaneously turned on.

Lens switching may influence an accuracy and sharpness of focusing. When the lens is switched from the wide-angle lens to the telephoto lens or when the lens is switched from the telephoto lens to the wide-angle lens, the switching may be implemented only after convergence of ACE value is completed (about 1 s), which may make a lens switching process not so smooth.

In the embodiment of the disclosure, when the zooming factor is within the target range, the wide-angle lens and the telephoto lens are simultaneously turned on. At the moment of lens switching, convergence of the AEC value has been completed in advance, so that a brightness convergence action of about 1 s is avoided, the lens switching process is smooth, the problem of flickering is solved, and a shooting experience of the user may be improved.

At 104, a first AEC value of the wide-angle lens and a second AEC value of the telephoto lens are acquired.

For example, the acquired first AEC value of the wide-angle lens may be marked as $AEC_1$, and the second AEC value of the telephoto lens may be marked as $AEC_2$.

It is to be noted that $AEC_1$ is an AEC value, converged to a stable state, of the wide-angle lens and $AEC_2$ is an AEC value, converged to a stable state, of the telephoto lens.

At 105, a target AEC value corresponding to the target zooming factor is determined according to the first AEC value and the second AEC value.

Optionally, during a specific implementation, in order to solve the problem of AEC brightness hopping during lens switching and improve a shooting effect, interpolation calculation may be performed on AEC values of the two lenses, namely the interpolation calculation is performed according to the first AEC value ($AEC_1$) and the second AEC value ($AEC_2$), and a result of the interpolation calculation is determined as the target AEC value.

Furthermore, a mapping relationship between a zooming factor and each of a first weight of the first AEC value ($AEC_1$) and a second weight of the second AEC value ($AEC_2$) may be established in advance. Therefore, after the target zooming factor is determined, the mapping relationship may be queried to acquire the first weight of the first AEC value ($AEC_1$) and the second weight of the second AEC value ($AEC_2$), and then weighted calculation is performed on the first AEC value and the second AEC value according to the first weight and the second weight.

Alternatively, the target AEC value corresponding to the target zooming factor may be determined according to any algorithm capable of solving the problem of AEC brightness hopping during lens switching and improving the shooting effect. There are no limits made thereto in the embodiment of the disclosure.

According to the method for suppressing AEC hopping in the embodiment, the target zooming factor that the photographic apparatus is trying to switch to is acquired, the wide-angle lens and the telephoto lens are controlled to be simultaneously turned on when the zooming factor is within the target range, the first AEC value of the wide-angle lens and the second AEC value of the telephoto lens are acquired, and the target AEC value corresponding to the target zooming factor is determined according to the first AEC value and the second AEC value. In the embodiment, when the target zooming factor is within the set range, the two lenses may be simultaneously turned on, and the AEC values of the two lenses are merged in advance, so that the problem of AEC brightness hopping during lens switching may be improved, a shooting effect may be improved, and a user experience may be improved.

Figure 2:
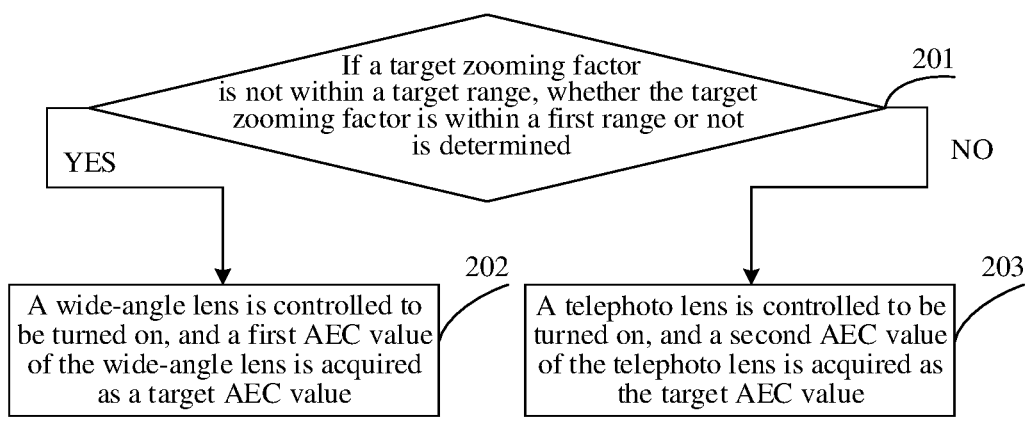
FIG. 2 is a flowchart of another method for suppressing AEC hopping according to an embodiment of the disclosure.

For specifically describing the abovementioned embodiment, referring to FIG. 2, based on the embodiment shown in FIG. 1, after 102, the method for suppressing AEC hopping may further include the following steps.

At 201, if the target zooming factor is not within the target range, whether the target zooming factor is within a first range or not is determined, if YES, 202 is executed, otherwise 203 is executed.

In the embodiment of the disclosure, the first range may be preset by the built-in program of the terminal device, or, the first range may also be set by the user according to the own requirement. There are no limits made thereto. For example, the first range may be [ZOOM 1×, ZOOM 1.5×].

Optionally, if the target zooming factor is not within the preset target range, there may be two cases. In one case, the target zooming factor is less than the first zooming factor, namely the target zooming factor is within the first range. In the other case, the target zooming factor is greater than the second zooming factor.

At 202, the wide-angle lens is controlled to be turned on, and the first AEC value of the wide-angle lens is acquired as the target AEC value.

Optionally, when the target zooming factor is less than the first zooming factor, namely the target zooming factor is within the first range, only the wide-angle lens may be turned on, and the acquired first AEC value ($AEC_1$) of the wide-angle lens is determined as the target AEC value. For example, when the target zooming factor is ZOOM 1.2×, it may be known that the target zooming factor is within the first range [ZOOM 1×, ZOOM 1.5×]. In such case, the wide-angle lens may be controlled to be turned on, and the acquired first AEC value, i.e., $AEC_1$, of the wide-angle lens is determined as the target AEC value.

At 203, the telephoto lens is controlled to be turned on, and the second AEC value of the telephoto lens is acquired as the target AEC value.

Optionally, when the target zooming factor is greater than the second zooming factor, for example, when the target zooming factor is ZOOM 7×, it may be known that the target zooming factor is not within the first range [ZOOM 1×, ZOOM 1.5×] and the preset target range [ZOOM 1.5×, ZOOM 6×]. In such case, the telephoto lens may be controlled to be turned on, and the acquired second AEC value, i.e., $AEC_2$, of the telephoto lens is determined as the target AEC value.

According to the method for suppressing AEC hopping in the embodiment, when the target zooming factor is within the first range, the wide-angle lens is controlled to be turned on, and the first AEC value of the wide-angle lens is acquired as the target AEC value. When the target zooming factor is not within the first range, the telephoto lens is controlled to be turned on, and the second AEC value of the telephoto lens is acquired as the target AEC value. Therefore, a photographing effect of the terminal device may further be improved.

Figure 3:
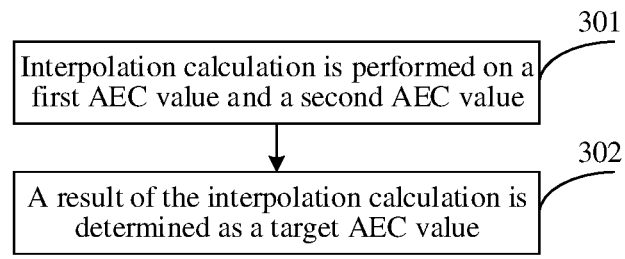
FIG. 3 is a flowchart of another method for suppressing AEC hopping according to an embodiment of the disclosure.

Referring to FIG. 3, a possible implementation of the embodiment of the disclosure is illustrated. Based on the embodiment shown in FIG. 1, the block 105 specifically includes the following sub-steps.

At 301, interpolation calculation is performed on the first AEC value and the second AEC value.

Specifically, when the target zooming factor is within the first range, namely when the target zooming factor is within [ZOOM 1×, ZOOM 1.5×], the target AEC value is the first AEC value ($AEC_1$). When the target zooming factor is not within the preset target range [ZOOM 1.5×, ZOOM 6×] and also not within the first range [ZOOM 1×, ZOOM 1.5×], namely when the target zooming factor is greater than ZOOM 6×, the target AEC value is the second AEC value ($AEC_2$).

Therefore, when the target zooming factor is within the preset target range [ZOOM 1.5×, ZOOM 6×], the target zooming factor is marked as $T_0$, and the target AEC value corresponding to the target zooming factor is marked as $AEC_0$. Then, an interpolation formula may be obtained as follows:

$$\frac{AEC_2 - AEC_1}{6X - 1.5X} = \frac{T_0 - 1.5X}{AEC_0 - AEC_1}. \qquad (1)$$

Then, the target AEC value may be obtained through the formula (1) as follows:

$$AEC_0 = AEC_1 + \frac{4.5(T_0 - 1.5)}{AEC_2 - AEC_1}. \qquad (2)$$

At 302, a result of the interpolation calculation is determined as the target AEC value.

For example, when the target zooming factor is ZOOM 3.5×, $T_0$ that is equal to 3.5 may be substituted into the formula (2) to obtain the target AEC value $AEC_0$, namely $AEC_0$ is $$AEC_1 + \frac{9}{AEC_2 - AEC_1}.$$

According to the method for suppressing AEC hopping in the embodiment, interpolation calculation is performed on the first AEC value and the second AEC value, and the result of the interpolation calculation is determined as the target AEC value, so that the photographing effect of the terminal device may further be improved.

Figure 4:
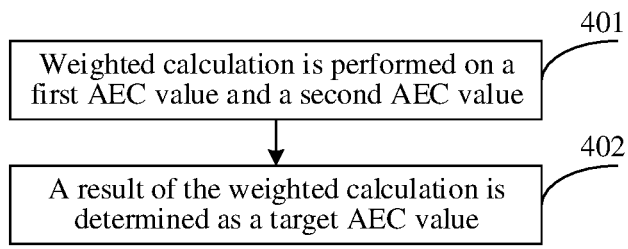
FIG. 4 is a flowchart of another method for suppressing AEC hopping according to an embodiment of the disclosure.

Referring to FIG. 4, another possible implementation of the embodiment of the disclosure is illustrated. Based on the embodiment shown in FIG. 1, the block 105 specifically includes the following sub-steps.

At 401, weighted calculation is performed on the first AEC value and the second AEC value.

As a possible implementation of the embodiment of the disclosure, the mapping relationship between the zooming factor and each of the first weight of the first AEC value and the second weight of the second AEC value may be established in advance. Therefore, after the target zooming factor is determined, the mapping relationship may be queried to acquire the first weight of the first AEC value and the second weight of the second AEC value.

For example, by querying the mapping relationship, the first weight of the first AEC value corresponding to the target zooming factor is obtained as a and the second weight of the second AEC value is obtained as β. Then, the weighted calculation may be performed on the first AEC value and the second AEC value to obtain $\alpha*AEC_1+\beta*AEC_2$.

At 402, a result of the weighted calculation is determined as the target AEC value.

Optionally, the target AEC value is marked as $AEC_0$, and the target AEC value is:

$$AEC_0 = \alpha*AEC_1 + \beta*AEC_2 \qquad (3).$$

According to the method for suppressing AEC hopping in the embodiment, weighted calculation is performed on the first AEC value and the second AEC value, and the result of the weighted calculation is determined as the target AEC value, so that the photographing effect of the terminal device may further be improved.

Figure 5:
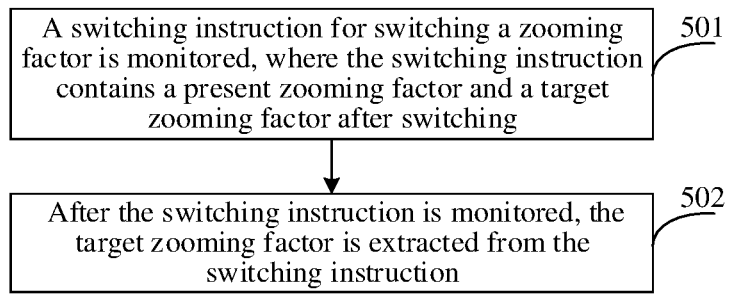
FIG. 5 is a flowchart of another method for suppressing AEC hopping according to an embodiment of the disclosure.

Referring to FIG. 5, a possible implementation of the embodiment of the disclosure is illustrated. Based on the embodiments shown in FIG. 1 to FIG. 4, the block 101 specifically includes the following steps.

At 501, a switching instruction for switching zooming factor is monitored. The switching instruction contains a present zooming factor and a target zooming factor after switching.

The switching instruction contains the present zooming factor and the target zooming factor after switching, and the switching instruction may be triggered by the user. For example, when the user is intended to switch from a distant view to a close view, the switching instruction may be triggered to switch from the telephoto lens to the wide-angle lens. When the user is intended to switch from the close view to the distant view, the switching instruction may be triggered to switch from the wide-angle lens to the telephoto lens. There are no limits made thereto.

Optionally, the terminal device may monitor the switching instruction for switching the zooming factor in real time, so as to switch the lens of the photographic apparatus. Introductions about a monitoring process of the switching instruction may refer to related contents recorded in the abovementioned embodiments and elaborations are omitted herein.

At 502, after the switching instruction is monitored, the target zooming factor is extracted from the switching instruction.

Since the switching instruction contains the present zooming factor and the target zooming factor after switching, after the switching instruction is monitored, the target zooming factor may be extracted from the switching instruction.

According to the method for suppressing AEC hopping in the embodiment, the switching instruction for switching the zooming factor is monitored, the switching instruction contains the present zooming factor and the target zooming factor after switching, and after the switching instruction is monitored, the target zooming factor is extracted from the switching instruction, so that AEC convergence may be accelerated when switching the zooming factor.

For implementing the abovementioned embodiments, the disclosure also discloses a device for suppressing AEC hopping.

Figure 6:
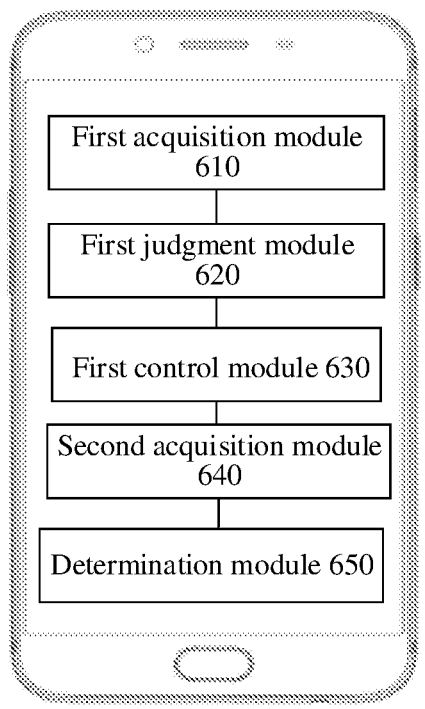
FIG. 6 is a structure diagram of a device for suppressing AEC hopping according to an embodiment of the disclosure.

FIG. 6 is a structure diagram of a device for suppressing AEC hopping according to an embodiment of the disclosure.

Referring to FIG. 6, the device for suppressing AEC hopping includes a first acquisition module 610, a first judgment module 620, a first control module 630, a second acquisition module 640 and a determination module 650.

The first acquisition module 610 is configured to acquire a target zooming factor that a photographic apparatus is trying to switch to.

During specific implementation, the first acquisition module 610 is specifically configured to: monitor a switching instruction for switching a zooming factor, the switching instruction containing a present zooming factor and the target zooming factor after switching, and after the switching instruction is monitored, extract the target zooming factor from the switching instruction.

The first judgment module 620 is configured to determine whether the target zooming factor is within a target range or not.

The first control module 630 is configured to, if the target zooming factor is within the target range, perform control to simultaneously turn on a wide-angle lens and a telephoto lens.

The second acquisition module 640 is configured to acquire a first AEC value of the wide-angle lens and a second AEC value of the telephoto lens.

The determination module 650 is configured to determine a target AEC value corresponding to the target zooming factor according to the first AEC value and the second AEC value.

As a possible implementation of the embodiment of the disclosure, the determination module 650 is specifically configured to perform interpolation calculation on the first AEC value and the second AEC value and determine a result of the interpolation calculation as the target AEC value.

As another possible implementation of the embodiment of the disclosure, the determination module 650 is specifically configured to perform weighted calculation on the first AEC value and the second AEC value and determine a result of the weighted calculation as the target AEC value.

During specific implementation, the determination module 650 is specifically configured to acquire a first weight of the first AEC value and a second weight of the second AEC value by query according to the target zooming factor and perform the weighted calculation on the first AEC value and the second AEC value according to the first weight and the second weight.

Figure 7:
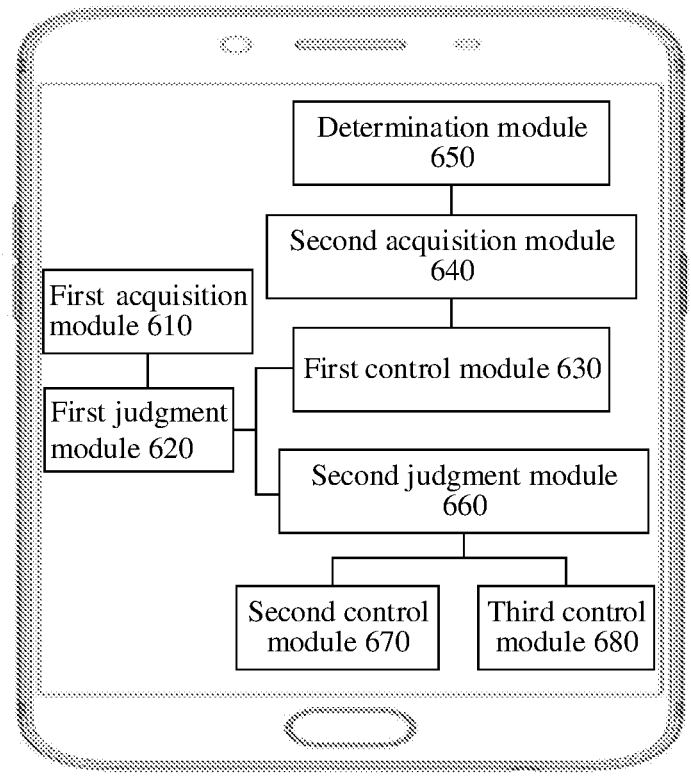
FIG. 7 is a structure diagram of another device for suppressing AEC hopping according to an embodiment of the disclosure.

Furthermore, referring to FIG. 7, a possible implementation of the embodiment of the disclosure is illustrated. Based on FIG. 6, the device for suppressing AEC hopping further includes a second judgment module 660, a second control module 670 and a third control module 680.

The second judgment module 660 is configured to, when the target zooming factor is not within the target range, determine whether the target zooming factor is within a first range or not.

The second control module 670 is configured to, when the target zooming factor is within the first range, perform control to turn on the wide-angle lens and acquire the first AEC value of the wide-angle lens as the target AEC value.

The third control module 680 is configured to, when the target zooming factor is not within the first range, perform control to turn on the telephoto lens and acquire the second AEC value of the telephoto lens as the target AEC value.

It is to be noted that explanations and descriptions about the method for suppressing AEC hopping in the embodiments shown in FIG. 1 to FIG. 5 are also applied to the device for suppressing AEC hopping in the embodiment and elaborations are omitted herein.

According to the device for suppressing AEC hopping in the embodiment, the target zooming factor that the photographic apparatus is trying to switch to is acquired, the wide-angle lens and the telephoto lens are controlled to be simultaneously turned on when the zooming factor is within the target range, the first AEC value of the wide-angle lens and the second AEC value of the telephoto lens are acquired, and the target AEC value corresponding to the target zooming factor is determined according to the first AEC value and the second AEC value. In the embodiment, when the target zooming factor is within the set range, the two lenses may be simultaneously turned on, and the AEC values of the two lenses are merged in advance, so that the problem of AEC brightness hopping during lens switching may be solved, a shooting effect may be improved, and a user experience may be improved.

For implementing the abovementioned embodiments, the disclosure also proposes a terminal device.

Figure 8:
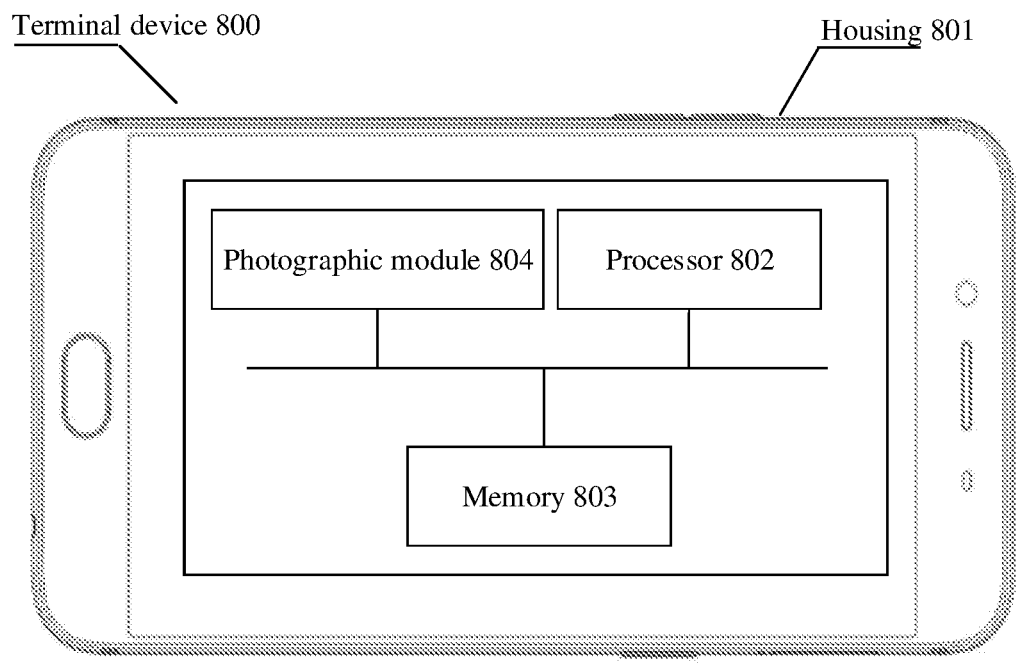
FIG. 8 is a structure diagram of a terminal device according to an embodiment of the disclosure.

FIG. 8 is a structure diagram of a terminal device according to an embodiment of the disclosure.

Referring to FIG. 8, the terminal device 800 includes one or more of the following components: a housing 801, as well as a processor 802, a memory 803 and a photographic module 804 that are located in the housing 801.

The processor 802 is configured to read an executable program code stored in the memory 803 to run a program corresponding to the executable program code, so as to implement the method for suppressing AEC hopping proposed in the abovementioned embodiments.

The disclosure also proposes a computer-readable storage medium having stored therein a computer program which, when being executed by a processor, implements the method for suppressing AEC hopping disclosed in the abovementioned embodiments.

The disclosure also proposes a computer program product, an instruction in the computer program product being executed by a processor to execute the method for suppressing AEC hopping disclosed in the abovementioned embodiments.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, unless otherwise explicitly and definitely indicated, "multiple" means at least two, for example, two, three, etc.

Any process or method in the flowcharts or described herein in another manner may be understood to represent a module, segment or part including codes of one or more executable instructions configured to realize specific logic functions or steps of the process and, moreover, the scope of the preferred implementation of the disclosure includes other implementation, not in a sequence shown or discussed herein, including execution of the functions basically simultaneously or in an opposite sequence according to the involved functions. This should be understood by those skilled in the art to which the embodiments of the disclosure pertain.

For example, logics and/or steps represented in the flowcharts or described herein in another manner may be considered as a fixed sequence list of executable instructions configured to realize the logic functions and may be specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, the "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable CD-ROM. In addition, the computer-readable medium may even be a paper or another suitable medium on which the program may be printed. For example, the paper or the other medium may be optically scanned, then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementations, multiple steps or methods may be implemented by software or firmware stored in a memory and executed by a proper instruction execution system. For example, in case of implementation with the hardware, like another implementation, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method in the abovementioned embodiment may be completed through related hardware instructed by a program, the program may be stored in a computer-readable storage medium, and when the program is executed, one or a combination of the steps in the method embodiment is executed.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a ROM, a magnetic disk, an optical disk or the like. Although the embodiments of the disclosure have been shown or described above, it can be understood that the abovementioned embodiments are exemplary and should not be understood as limiting the scope of the disclosure. Those of ordinary skill in the art may make variations, modifications, replacements, transformations to the abovementioned embodiments within the scope of the disclosure.

The invention claimed is:

1. A method for suppressing Automatic Exposure Control (AEC) hopping, comprising:
    acquiring a target zooming factor that a photographic apparatus is trying to switch to;
    determining whether the target zooming factor is within a preset target range or not;
    in response to determining that the zooming factor is within the target range, performing control to simultaneously turn on a wide-angle lens and a telephoto lens;
    acquiring a first AEC value of the wide-angle lens and a second AEC value of the telephoto lens; and
    determining a target AEC value corresponding to the target zooming factor according to the first AEC value and the second AEC value.

2. The method for suppressing AEC hopping of claim 1, wherein determining the target AEC value corresponding to the target zooming factor according to the first AEC value and the second AEC value comprises:
    performing interpolation calculation on the first AEC value and the second AEC value; and
    determining a result of the interpolation calculation as the target AEC value.

3. The method for suppressing AEC hopping of claim 1, wherein determining the target AEC value corresponding to the target zooming factor according to the first AEC value and the second AEC value comprises:
    performing weighted calculation on the first AEC value and the second AEC value; and
    determining a result of the weighted calculation as the target AEC value.

4. The method for suppressing AEC hopping of claim 3, wherein performing weighted calculation on the first AEC value and the second AEC value comprises:
    acquiring a first weight of the first AEC value and a second weight of the second AEC value by query according to the target zooming factor; and
    performing weighted calculation on the first AEC value and the second AEC value according to the first weight and the second weight.

5. The method for suppressing AEC hopping of claim 1, wherein acquiring the target zooming factor that the photographic apparatus is trying to switch to comprises:
    monitoring a switching instruction for switching a zooming factor, wherein the switching instruction contains a present zooming factor and the target zooming factor after switching; and
    after the switching instruction is monitored, extracting the target zooming factor from the switching instruction.

6. The method for suppressing AEC hopping of claim 1, further comprising:
    in response to determining that the target zooming factor is not within the target range, determining whether the target zooming factor is within a first range or not;

in response to determining that the target zooming factor is within the first range, performing control to turn on the wide-angle lens, and acquiring the first AEC value of the wide-angle lens as the target AEC value; and in response to determining that the target zooming factor is not within the first range, performing control to turn on the telephoto lens, and acquiring the second AEC value of the telephoto lens as the target AEC value.

7. The method for suppressing AEC hopping of claim 1, wherein the first AEC value is an AEC value, converged to a stable state, of the wide-angle lens, and the second AEC value is an AEC value, converged to a stable state, of the telephoto lens.

8. A device for suppressing Automatic Exposure Control (AEC) hopping, comprising:
   a processor; and
   a memory for storing instructions executable by the processor, wherein the processor is configured to execute the instructions to:
   acquire a target zooming factor that a photographic apparatus is trying to switch to;
   determine whether the target zooming factor is within a target range or not;
   in response to determining that the target zooming factor is within the target range, perform control to simultaneously turn on a wide-angle lens and a telephoto lens;
   acquire a first AEC value of the wide-angle lens and a second AEC value of the telephoto lens; and
   determine a target AEC value corresponding to the target zooming factor according to the first AEC value and the second AEC value.

9. The device for suppressing AEC hopping of claim 8, wherein the processor is specifically configured to:
   perform interpolation calculation on the first AEC value and the second AEC value; and
   determine a result of the interpolation calculation as the target AEC value.

10. The device for suppressing AEC hopping of claim 8, wherein the processor is specifically configured to:
    perform weighted calculation on the first AEC value and the second AEC value; and
    determine a result of the weighted calculation as the target AEC value.

11. The device for suppressing AEC hopping of claim 10, wherein the processor is further configured to:
    acquire a first weight of the first AEC value and a second weight of the second AEC value by query according to the target zooming factor; and
    perform weighted calculation on the first AEC value and the second AEC value according to the first weight and the second weight.

12. The device for suppressing AEC hopping of claim 8, wherein the processor is specifically configured to:
    monitor a switching instruction for switching a zooming factor, wherein the switching instruction contains a present zooming factor and the target zooming factor after switching; and
    after the switching instruction is monitored, extract the target zooming factor from the switching instruction.

13. The device for suppressing AEC hopping of claim 8, wherein the processor is specifically configured to:
    in response to determining that the target zooming factor is not within the target range, determine whether the target zooming factor is within a first range or not;
    in response to determining that the target zooming factor is within the first range, perform control to turn on the wide-angle lens and acquire the first AEC value of the wide-angle lens as the target AEC value; and
    in response to determining that the target zooming factor is not within the first range, perform control to turn on the telephoto lens and acquire the second AEC value of the telephoto lens as the target AEC value.

14. The device for suppressing AEC hopping of claim 8, wherein the first AEC value is an AEC value, converged to a stable state, of the wide-angle lens, and the second AEC value is an AEC value, converged to a stable state, of the telephoto lens.

15. A non-transitory computer-readable storage medium having stored therein a computer program, wherein the computer program is executed by a processor to implement a method for suppressing Automatic Exposure Control (AEC) hopping, wherein the method comprising:
    acquiring a target zooming factor that a photographic apparatus is trying to switch to;
    determining whether the target zooming factor is within a preset target range or not;
    in response to determining that the target zooming factor is within the target range, performing control to simultaneously turn on a wide-angle lens and a telephoto lens;
    acquiring a first AEC value of the wide-angle lens and a second AEC value of the telephoto lens; and
    determining a target AEC value corresponding to the target zooming factor according to the first AEC value and the second AEC value.

16. The non-transitory computer-readable storage medium of claim 15, wherein determining the target AEC value corresponding to the target zooming factor according to the first AEC value and the second AEC value comprises:
    performing interpolation calculation on the first AEC value and the second AEC value; and
    determining a result of the interpolation calculation as the target AEC value.

17. The non-transitory computer-readable storage medium of claim 15, wherein determining the target AEC value corresponding to the target zooming factor according to the first AEC value and the second AEC value comprises:
    performing weighted calculation on the first AEC value and the second AEC value; and
    determining a result of the weighted calculation as the target AEC value.

18. The non-transitory computer-readable storage medium of claim 17, wherein performing weighted calculation on the first AEC value and the second AEC value comprises:
    acquiring a first weight of the first AEC value and a second weight of the second AEC value by query according to the target zooming factor; and
    performing weighted calculation on the first AEC value and the second AEC value according to the first weight and the second weight.

19. The non-transitory computer-readable storage medium of claim 15, wherein acquiring the target zooming factor that the photographic apparatus is trying to switch to comprises:
    monitoring a switching instruction for switching a zooming factor, wherein the switching instruction contains a present zooming factor and the target zooming factor after switching; and
    after the switching instruction is monitored, extracting the target zooming factor from the switching instruction.

20. The non-transitory computer-readable storage medium of claim 15, further comprising:

in response to determining that the target zooming factor is not within the target range, determining whether the target zooming factor is within a first range or not;

in response to determining that the target zooming factor is within the first range, performing control to turn on the wide-angle lens, and acquiring the first AEC value of the wide-angle lens as the target AEC value; and in response to determining that the target zooming factor is not within the first range, performing control to turn on the telephoto lens, and acquiring the second AEC value of the telephoto lens as the target AEC value.

\* \* \* \* \*

UNITED STATES PATENT AND TRADEMARK OFFICE
CERTIFICATE OF CORRECTION

PATENT NO. : 10,819,913 B2  
APPLICATION NO. : 16/630332  
DATED : October 27, 2020  
INVENTOR(S) : Quan Yuen Page 1 of 1

It is certified that error appears in the above-identified patent and that said Letters Patent is hereby corrected as shown below:

On the Title Page

Item (73) the Assignee named:  
GUANGDONG OPPO MOBILE TELECOMUNNICATIONS CORP., LTD., Guangdong (CN)  
Is changed to:  
GUANGDONG OPPO MOBILE TELECOMMUNICATIONS CORP., LTD., Dongguang, Guangdong (CN)

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*